PORTABLE FLASHER LAMP WITH PHOTO-CELL CONTROLLED TRANSISTOR OSCILLATOR CIRCUIT

Filed May 1, 1959

3 Sheets-Sheet 1

INVENTOR.

Ray B Grontkowski

BY Day J. Mraz his ATTORNEY

June 30, 1964 R. B. GRONTKOWSKI 3,139,556

PORTABLE FLASHER LAMP WITH PHOTO-CELL CONTROLLED TRANSISTOR OSCILLATOR CIRCUIT

Filed May 1, 1959 3 Sheets-Sheet 2

INVENTOR.

Ray B Grontkowski

BY

ATTORNEY

INVENTOR.
Roy B. Grontkowski
BY
[signature]
ATTORNEY

United States Patent Office 3,139,556

Patented June 30, 1964

3,139,556
PORTABLE FLASHER LAMP WITH PHOTOCELL CONTROLLED TRANSISTOR OSCILLATOR CIRCUIT

Ray B. Grontkowski, Bronx, N.Y., assignor to Signal-Stat Corporation, Brooklyn, N.Y., a corporation of New York Filed May 1, 1959, Ser. No. 810,495
12 Claims. (Cl. 315—158)

This invention relates to intermittently energized electric circuits and, more particularly to transistorized circuits of this type selectively triggered or rendered operative or inoperative by a photoelectric cell of the photovoltaic type. The invention is further directed to a novel intermittently energized portable flasher or warning lamp incorporating such circuits and selectively controlled either automatically or manually.

Portable, battery operated flashing lamps presently in use rely on electronic, electro-mechanical, or thermo-responsive circuit interrupting means or "flashers." Such lamps as presently provided are unsatisfactory for several reasons, including inadequate means for automatically energizing and de-energizing the lamps in response to variations in ambient light values or illumination. Due to this factor, automatic control means are usually not incorporated in the lamp, and manual "off-on" controls are used instead. Hence, the lamps operate when ambient light conditions are such that the lamps are not needed and, due to delays in manual attention, may not be operating when needed, as after dusk and at night.

In addition, servicing and maintenance costs are high due not only to the necessity for manual attention but also to excessive wear on contacts and mechanical parts and short life of relatively expensive lamps and other components.

In the usual case, known portable flashing warning lamps require relatively high voltage, high capacity batteries, and it is difficult to stabilize or control the flashing rate. With battery power being required for operation of the control components, which frequently have a heavy current drain, the power available for the warning lamp is sufficient only to provide a limited intensity of illumination.

The compactness and efficiency of such warning lamps could be increased, along with substantial reduction in the current drain on the main battery and in the servicing and maintenance costs, by utilizing an electronic type of circuit interrupter, without moving parts or movable contacts, such as transistorized components. However, substantial difficulties are presented in utilizing a transistorized circuitry in conjunction with an automatic triggering control involving a photocell, particularly a photocell of the photovoltaic or output potential developing type.

The internal resistance of transistors varies with temperatures, applied potential, output current, and the quality of the transistors. Also, transistors are subject to leakage currents between the collector and base, varying in magnitude due to the same factors. Unless the effect of the resistance variations is reduced to a negligible value, it is not possible to controllably maintain a preset flashing rate. In addition, unless such leakage current is blocked, the battery drain is excessive. Furthermore, in the usual transistor circuit, biasing batteries are required in addition to the main supply battery.

In accordance with the present invention, such difficulties are overcome in a novel manner by improved circuitry in which a photovoltaic device or component is used not only to "trigger" the intermittent circuit between operative and inoperative states or conditions, but also to provide the transistor bias potentials and a leakage current blocking potential.

Further, by a novel combination of printed circuitry and associated switching and conductor means, a photocell controlled transistor circuit is incorporated in a lightweight, high efficiency, portable battery-operated warning lamp which, in a unique manner, may be placed selectively in the "off" state or in the "on" state under either photocell or manual control. The flashing cycle is the same whether under photocell control or manual control. The lamp further includes novel mechanical and electric circuit features.

For an understanding of the invention principles, reference is made to the following description of typical embodiments thereof as illustrated in the accompanying drawings. In the drawings.

Figure 1:
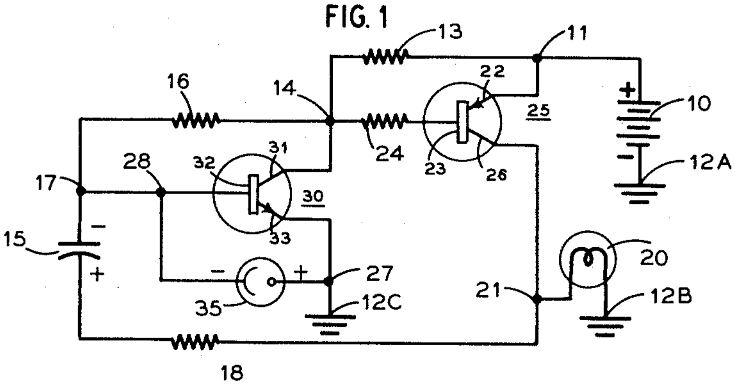
FIGS. 1, 2 and 3 are schematic wiring diagrams of automatically controlled, intermittent lamp energizing circuits embodying the invention.

Referring to FIG. 1, a suitable source of direct current, such as a 6-volt battery 10, is illustrated as having its positive terminal connected to a junction point 11 and its negative terminal connected to a reference point, such as ground 12A. Through point 11, resistor 13, junction point 17, condenser 15, and resistor 18, positive potential is applied to a junction point 21. A load, such as incandescent lamp 20, is connected between point 21 and a reference point, such as ground 12B at the same polarity as point 12A.

A semi-conductor, in the form of a junction transistor 25 of the PNP type, has its emitter electrode 22 connected to point 11, its base electrode 23 connected through resistor 24 to point 14, and its collector electrode 26 connected to point 21.

A second junction transistor 30, of the NPN type, has its collector electrode 31 connected to point 14, its base electrode 32 connected to point 17, and its emitter electrode 33 connected to a junction point 27 which is connected to a reference point 12C at the same potential and polarity as point 12A.

A junction point 28 is connected to point 17 and base electrode 32, and a photoelectric cell 35, of the photovoltaic or potential generating type, has its positive terminal connected to point 27 and its negative terminal connected to point 28.

Photo-electric cell 35 has the characteristic of generating a potential of up to 0.58 volt when light impinges upon its light-sensitive surface. This potential will cause to flow, in an external connected circuit, a current whose magnitude is a function of the resistance of such circuit and the amount of illumination incident upon the photocell.

Transistors, such as 25 and 30, are subject to leakage between the collector and base electrode. In accordance with the invention, it has been found that shorting or shunting the base and emitter electrodes results in a smaller current leakage. Furthermore, if the base to emitter junction has a reverse biasing potential in excess of 0.2 volt applied thereto, the leakage current is substantially eliminated. Such reverse biasing results in the highest resistance across an open circuited transistor. Advantage is taken of these phenomena in the circuits of FIGS. 1, 2 and 3.

Referring again to FIG. 1, if the light effectively incident upon photocell 35 is of low intensity, such as 30 foot candles or less, the output voltage of photocell 35 will be substantially less than 0.2 volt. With photocell 35 connected as shown to provide the reverse bias potential across transistor 30, the reverse bias potential, under these conditions, is substantially less than the forward bias potential between emitter junction 27 and base junction 28. Hence there will be a leakage current flow through transistor 30.

Under these conditions, resistor 16 draws current from battery 10 through limiting resistor 13. Transistor 30, having a potential drop thus impressed thereacross, becomes conductive, so that point 14 becomes relatively negative. This causes transistor 25 to conduct, completing a circuit including point 11, emitter electrode 22, collector electrode 26, point 21, lamp 20 and point 12B. Resistor 24 limits the voltage between collector electrode 31, of transistor 30, and base terminal 23, of transistor 25.

Due to transistor 25 conducting, its collector electrode 26 becomes relatively positive, so that point 21 is relatively positive. With point 14 relatively negative, capacitor 15 charges in a positive direction so that the negative charges accumulated at points 17 and 28 cut off transistor 30. Capacitor 15 discharges through base electrode 32 and emitter electrode 33, of transistor 30, to reference point 12C.

With transistor 30 thus blocked by the reverse bias potential of condenser 15, transistor 25 becomes nonconducting to block current to lamp 20. The cycle then repeats after discharge of condenser 15. The "on" time of the flashing cycle is determined by the value of resistor 18 and the resistance of lamp 20, which factors determine the charging rate of condenser 15. The condenser discharge rate depends upon the tendency of transistor 30 to remain conductive by drawing base current through resistors 13 and 16.

The flashing cycle remains operative until such time as the illumination effective upon photocell 35 is sufficient for the output potential to exceed the forward bias of about 0.2 volt through transistor 30. If the effective incident light reaches the 33 foot candles level, the photocell develops a potential of about 0.23 volt, which is sufficient to block conduction of transistor 30. The circuit then remains inoperative until the effective incident illumination on the photocell drops to or below a predetermined low level.

Figure 2:
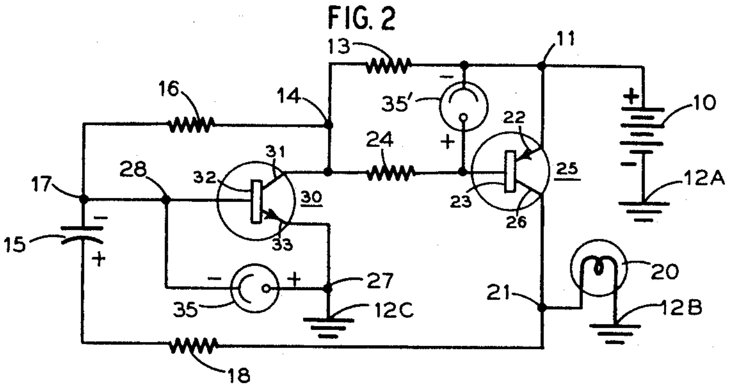

The circuit of FIG. 2 is, with the exception of one added component, the same as that of FIG. 1, so that the same reference characters have been used to designate the same parts. Transistor 25, being of the PNP or power type, normally will have a greater current leakage between base electrode 23 and collector electrode 26 than will transistor 30.

To reduce or substantially eliminate this leakage in transistor 25, a second photovoltaic cell 35′ is connected between emitter electrode 22 and base electrode 23, with the illustrated relative polarity. Illumination of the order of several hundred foot candles effective upon photocell 35′ will result in an output potential in excess of 0.2 volt. This is sufficient to change the internal resistance of transistor 25 enough to result in reverse biasing thereof with resultant blocking of the leakage current. When the effective incident illumination is reduced below a pre-set value, this reverse bias is no longer effective. Photocell 35′ eliminates the need for the usual additional battery to provide the bias voltage, together with the required switching connections and manual attention.

Figure 3:
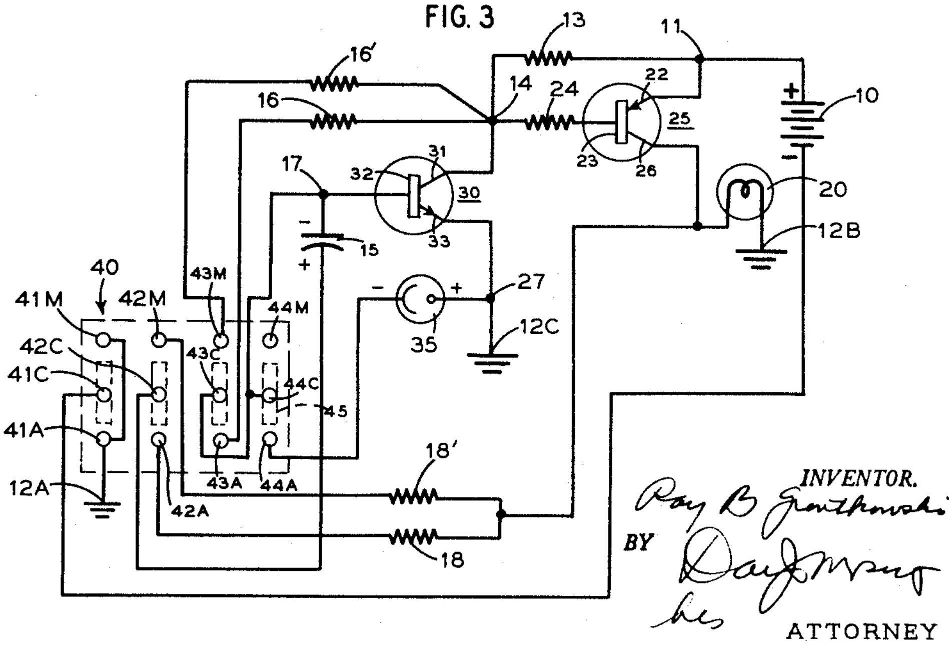
Figure 4:
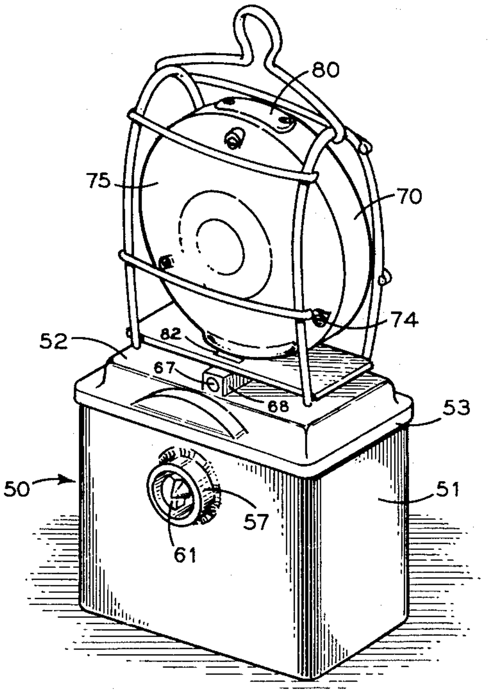
FIG. 4 is a perspective view of a portable warning lamp embodying the invention.
Figure 5:
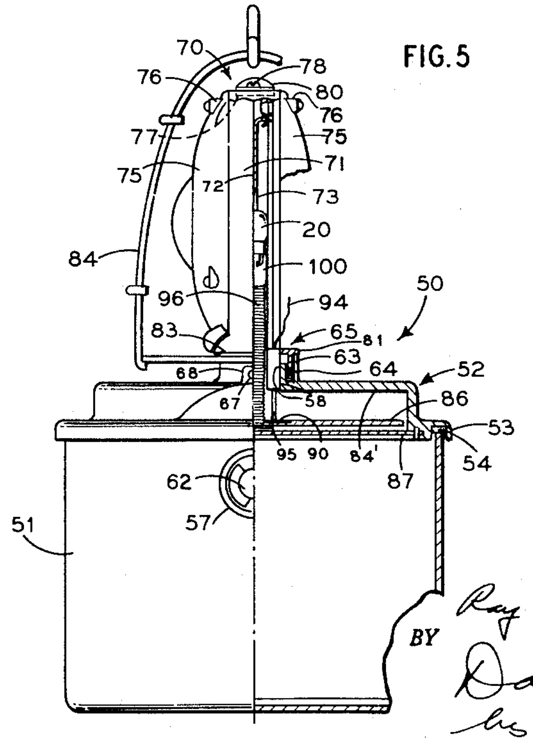
FIG. 5 is an elevation view of the lamp, one side being shown in section.
Figure 6:
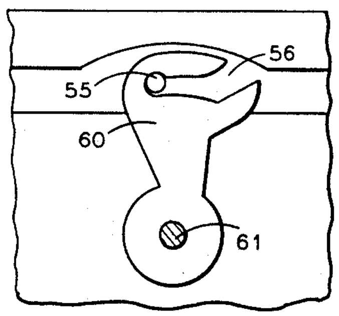
FIG. 6 is an elevation view of locking mechanism for the lamp.
Figure 7:
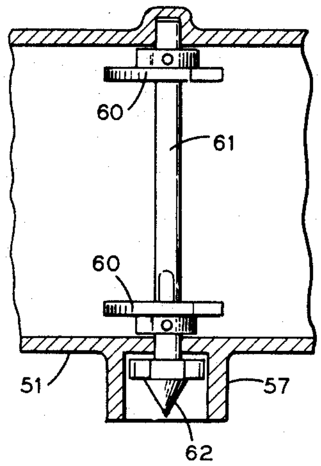
FIG. 7 is a horizontal sectional view of the lock mechanism.

FIG. 3 illustrates the circuitry as modified to incorporate a three-position switch so that the circuit can be selectively (1) inoperative, (2) operative under photocell control, or (3) operative under manual control. In the latter two cases, the time constants of the flashing cycle remain the same. The same reference characters are again used for the same parts.

The switch 40 of FIG. 3 includes fixed center contacts 41C to 44C, fixed "MANUAL" contacts 41M to 44M, and fixed "AUTOMATIC" contacts 41A to 44A. The center contacts may be selectively connected to either the "M" or the "A" contacts by four contact strips 45, or may be disconnected from both the "M" and the "A" contacts in the "lamp off" intermediate position of strips 45.

When switch 40 is in the "AUTOMATIC" position, strips 45 connect the "C" contacts to the "A" contacts. In this case, it will be noted that the circuitry is the same as in FIG. 1, contacts 41A and 41C connecting the negative terminal of battery 10 to point 12A, contacts 42A and 42C connecting capacitor 15 to resistor 18, contacts 43A and 43C connecting resistor 16 to point 17, and contacts 44A and 44C connecting photocell 35 to point 17.

In the "MANUAL-ON" position of switch 40, strips 45 connect the "C" contacts to the "M" contacts. Contacts 41C and 41M again connect the negative terminal of battery 10 to reference point 12A. Contacts 42C and 42M connect condenser 15 to a resistor 18′ connected in parallel with resistor 18 to point 21. Contacts 43C and 43M connect point 17 to a resistor 16′ connected in parallel with resistor 16 to point 14. Photocell 35 is not connected in the circuit. The values of resistors 16′ and 18′ are so selected that the time constants of the circuit are the same as with "AUTOMATIC-ON" operation with photocell 35 in the circuit.

For storage of the lamp or extended periods of nonuse, strips 45 are moved to the central or "LAMP-OFF" position, and there is no drain on battery 10 which is effectively disconnected from the circuit at contacts 41.

Referring to FIGS. 4–10, a portable warning lamp 50 embodying the invention includes a battery casing or housing 51 and a cover 52, preferably of a sturdy metal such as steel. Cover 52 has a channeled rim 53 in which is seated a gasket 54 which is compressed against the upper edge of casing 51 when the cover is locked to the casing.

The locking means includes axially aligned pins 55 extending across recesses 56 in cover 52 and cooperable with forked latches 60 on a shaft 61 extending across housing 51 and projecting through a tubular boss 57 on the outer surface of the housing. Shaft 61 has a "nut" 62 on its end in boss 57 engageable by a suitable socket wrench to operate the lock. Latches 60 are so designed that they initially pull cover 52 toward housing 51, compressing gasket 64. As pins 55 enter the enlarged inner ends of the latches, such pull is slightly released, resulting in a snap action of the lock. A similar snap action takes place when the lock is released, as pins 55 leave the enlarged inner ends of the forks.

The upper surface of cover 52 has a central aperture 58 surrounded by spaced, concentric cylindrical walls 63 defining an annular channel receiving a tubular boss 64 on the base 65 of a lamp casing 70. The lower end of boss 64 has a channel 66 on its outer surface in which are engaged diametrically opposite set screws 67 threaded through radial bosses 68 extending from outer wall 63 and integral with the cover. Set screws 67 disengageably secure casing 70 to cover 52.

Casing 70 includes a circular wall 71 extending from base 65, and a partition 72 disposed intermediate the ends of wall 71 and having a keyhole shape central opening 73. Translucent lenses 75 are secured to wall 71 by screws 74 threaded into bosses 76. In a typical lamp, one lens may be amber and the other red in color. The upper surface of wall 71 has a recess 77 for photocell 35, recess 77 being closed by a transparent cover 80 secured to wall 71 by screws 78.

Base 65 has a circumferential flange 81 beneath which are diametrically opposite tabs 82. These tabs enter correspondingly located and shaped notches in the base 83 of a guard 84, base 83 being held against outer wall 63 by flange 81 when casing 75 is secured to cover 52.

Figure 8:
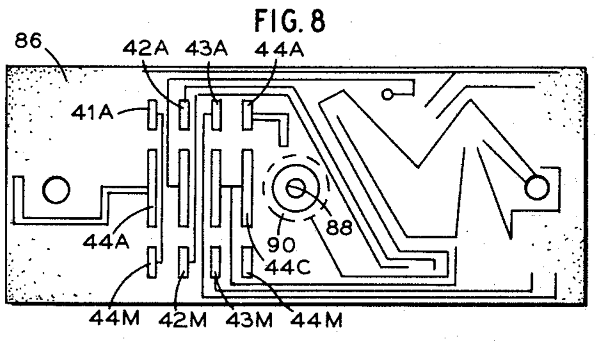
FIG. 8 is a plan view of one section of the printed circuit component.
Figure 9:
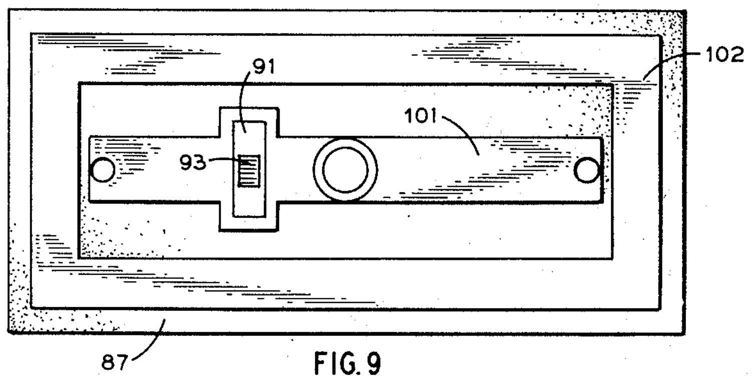
FIG. 9 is a bottom plan view of such component.
Figure 10:
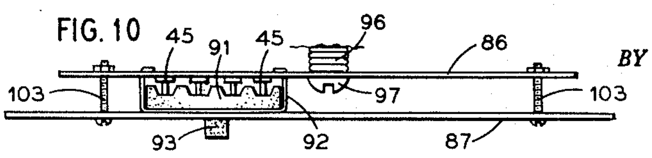
FIG. 10 is a side elevation view of the printed circuit and selector switch component.

It will be noted that cover 52 has a downwardly opening recess 84′ inwardly of rim 53 and provided by an upward offset of the cover above rim 53. This recess and the bottom surface of rim 53 conjointly seat spaced dielectric plates 86, 87 (FIGS. 8–10) containing the printed circuits. As best seen in FIG. 8, upper plate 86 has the contacts 41–44 of switch 40 printed on its under surface. In addition, the upper surface of plate 86 has an annular contact 90 centrally thereof and concentric with an aperture 88. A dielectric slide 91 is guided for movement between plates 86, 87 in a channel guide 92, and has four slots in its upper surface carrying the spring contacts 45. An operating button 93 for slide 91 projects through a slot in lower plate 87.

Annular contact 90 is engaged by a spring pressed brush 95 in base 65 and connected by a conductor 94 to the negative terminal of photocell 35 in recess 77. An elongated coil spring 96 is secured to plate 86 by a screw 97 in aperture 88, and extends upwardly through base 65 and aperture 73 in partition 72 to form the support for a lamp socket. A bayonet lamp socket 100 on the upper end of spring 96 receives lamp 20 and has a central contact connected to the circuitry printed on plate 86.

Lower plate 87 has battery contact strips 101, 102 on its undersurface, plates 86, 87 being interconnected by bolts 103. It will be noted that all the circuitry except battery 10 is mounted in cover 52 and thus removable therewith. When cover 52 is replaced, strips 101, 102 automatically engage the positive and negative terminals of battery 10 in housing 51.

While specific embodiments of the invention have been shown and described in detail to illustrate the application of the invention principles, it will be understood that the invention may be embodied otherwise without departing from such principles.

What is claimed is:

1. An intermittently energized electric circuit comprising, in combination, a source of D.C. potential; a load having one side connected to one terminal of said source; a first transistor having its emitter connected to the other terminal of said source and its collector connected to the other side of said load; a second transistor having its emitter connected to said one terminal and its collector connected to said other terminal; a condenser connected between the base terminal of said second transistor and the other side of said load; circuit means connecting the base of said first transistor to the collector of said second transistor; and a photo-voltaic cell connected between the base and emitter of said second transistor and operable to provide a bias voltage opposing leakage current flow between the collector and base of said second transistor; said second transistor being conductive when the ambient light on said cell is of a value such that said bias voltage is less than the forward bias voltage of said second transistor to render said first transistor conductive for current flow through said load; said condenser charging, during such load current flow, to block said first transistor, and then discharging through said second transistor to such one terminal of said source to re-start the cycle.

2. An intermittently energized electric circuit comprising, in combination, a source of D.C. potential; a load having one side connected to one terminal of said source; a first transistor having its emitter connected to the other terminal of said source and its collector connected to the other side of said load; a second transistor having its emitter connected to said one terminal and its collector connected to said other terminal; a condenser connected between the base terminal of said second transistor and the other side of said load; a resistor connected in series between said condenser and the other side of said load;

circuit means connecting the base of said first transistor to the collector of said second transistor; and a photo-voltaic cell connected between the base and emitter of said second transistor and operable to provide a bias voltage opposing leakage current flow between the collector and base of said second transistor; said second transistor being conductive when the ambient light on said cell is of a value such that said bias voltage is less than the forward bias voltage of said second transistor to render said first transistor conductive for current flow through said load; said condenser charging, during such load current flow, to block said first transistor, and then discharging through said second transistor to such one terminal of said source to restart the cycle.

3. A circuit as claimed in claim 1 in which said first transistor is a PNP junction transistor and said second transistor is an NPN junction transistor.

4. A circuit as claimed in claim 1 including a second photo-voltaic cell connected between the base and emitter of said first transistor and operable to provide a bias voltage opposing leakage current flow between the collector and base of said first transistor.

5. A circuit as claimed in claim 1 including a manually operable switch included in said circuit and selectively operable to (1) disconnect said source from the remainder of said circuit, or (2) connect said photo-voltaic cell in circuit, or (3) disconnect said cell from said circuit.

6. A circuit as claimed in claim 5 in which said load is a lamp and said source is a battery; a housing receiving said battery; a cover engageable with said housing; means disengageably locking said cover to said housing; and a lamp casing on said cover enclosing said lamp having a translucent section receiving said photo-voltaic cell.

7. A portable, self-energized flashing warning lamp comprising, in combination, a housing having an open upper end; a hollow cover engageable with said housing; means disengageably locking said cover to said housing; a battery in said housing having a pair of terminals on its upper end; a lamp casing extending upwardly from said cover and having an outwardly opening recess in its rim closed by a translucent cover; a printed circuit unit, including dielectric plate means, mounted in said cover, the printed circuit including conductive material engageable with the respective battery terminals when said cover is engaged with said housing; a relatively elongated lamp socket support mechanically secured to said unit to extend into said lamp casing; a lamp socket on the free end of said support electrically connected to the printed circuit; a lamp engaged in said lamp socket; the printed circuit including circuit connections connecting one side of said lamp to one terminal of said battery, a first transistor having its emitter connected to the other terminal of said battery and its collector connected to the other side of said lamp, a second transistor having its emitter connected to said one battery terminal and its collector connected to said battery terminal, a condenser connected between the base terminal of said second transistor and the other side of said lamp, a resistor connected in series between said condenser and the other side of said lamp, circuit means connecting the base of said first transistor to the collector of said second transistor and a photo-voltaic cell mounted in said casing recess and connected between the base and emitter of said second transistor and operable to provide a bias voltage opposing leakage current flow between the collector and base of said second transistor; said second transistor being conductive when the ambient light on said cell is of a value such that said bias voltage is less than the forward bias voltage of said second transistor to render said first transistor conductive for current flow through said load; said condenser charging, during such load current flow, to block said first transistor, and then discharging through said second transistor to such one terminal of said source to re-start the cycle.

8. A portable, self-energized flashing warning lamp comprising, in combination, a housing having an open upper end; a hollow cover engageable with said housing; means disengageably locking said cover to said housing; a battery in said housing having a pair of terminals on its upper end; a lamp casing extending upwardly from said cover, having a tubular base engageable in a tubular boss extending from the outer surface of said cover and having an outwardly opening recess in its rim closed by a translucent cover; a printed circuit unit, including dielectric plate means, mounted in said cover, the printed circuit including conductive material engageable with the respective battery terminals when said cover is engaged with said housing; a relatively elongated lamp socket support mechanically secured to said unit to extend through said tubular boss and tubular base into said lamp casing; a lamp socket on the free end of said support electrically connected to the printed circuit; a lamp engaged in said lamp socket; the printed circuit including circuit connections connecting one side of said lamp to one terminal of said battery, a first transistor having its emitter connected to the other terminal of said battery and its collector connected to the other side of said lamp, a second transistor having its emitter connected to said one battery terminal and its collector connected to said other battery terminal, a condenser connected between the base terminal of said second transistor and the other side of said lamp, a resistor connected in series between said condenser and the other side of said lamp, and circuit means connecting the base of said first transistor to the collector of said second transistor; a photo-voltaic cell mounted in said casing recess and connected between the base and emitter of said second transistor and operable to provide a bias voltage opposing leakage current flow between the collector and base of said second transistor; said photo-voltaic cell being connected to said unit by conductor means including a spring biased contact extending eccentrically through said tubular base and engage a ring of conductive material on said dielectric plate means and concentric with said tubular base; said second transistor being conductive when the ambient light on said cell is of a value such that said bias voltage is less than the forward bias voltage of said second transistor to render said first transistor conductive for current flow through said load; said condenser charging, during such load current flow, to block said first transistor, and then discharging through said second transistor to such one terminal of said source to re-start the cycle.

9. A lamp as claimed in claim 8 in which said printed circuit unit includes a pair of vertically spaced interconnected dielectric plates, the lower plate having on its lower surface the conductive material engageable with the respective battery terminals and the upper plate having on its upper surface said ring of conductive material.

10. A lamp as claimed in claim 9 including a manually operable switch included in said circuit and selectively operable to (1) disconnect said source from the remainder of said circuit, or (2) connect said photo-voltaic cell in circuit, or (3) disconnect said cell from said circuit; said switch comprising a movable member reciprocable in guided relation between said plates and carry resilient circuit closers operatively associated with the printed circuit components, and a switch operator projecting through the lower plate.

11. A lamp as claimed in claim 7 in which said socket support comprises a relatively elongated coil spring.

12. A lamp as claimed in claim 7 in which said locking means comprises a shaft extending across said housing and having an operating end projecting therefrom; and a pair of forked latches secured to axially spaced portions of said shaft and having snap action cooperation with a pair of pins in said cover.

References Cited in the file of this patent

UNITED STATES PATENTS

| | | |
|---|---|---|
| 2,882,450 | McCabe | Apr. 14, 1959 |
| 2,887,592 | Stout et al. | May 19, 1959 |
| 2,901,669 | Coleman | Aug. 25, 1959 |

OTHER REFERENCES

"Flash Light With Transistors," Popular Electronics, September 1958, pp. 75–76.

"Transistorized Headlight Dimmer," Radio and Television News, August 1955, pp. 56–57.